US005511201A

United States Patent [19]

[11] Patent Number: 5,511,201

[45] Date of Patent: Apr. 23, 1996

Kamimaki et al.

[54] DATA PROCESSING APPARATUS, POWER SUPPLY CONTROLLER AND DISPLAY UNIT

[75] Inventors: Hideki Kamimaki, Yokohama; Kiyokazu Nishioka; Tsuguji Tachiuchi, both of Odawara; Nobuo Tsuchiya; Masahiro Jinushi, both of Fujisawa; Hitoshi Sadamitsu, Hiratsuka; Hiroshi Ito, Hadano; Takashi Yoshitomi, Fujisawa; Koichi Isaji, Nagoya; Takao Ohba, Hadano, all of Japan

[73] Assignees: Hitachi, Ltd., Tokyo; Hitachi Video & Information System, Inc., Kanagawa, both of Japan

[21] Appl. No.: 857,629

[22] Filed: Mar. 25, 1992

[30] Foreign Application Priority Data

Mar. 26, 1991 [JP] Japan .................................... 3-062000

[51] Int. Cl.[6] ............................ G06F 11/00; G06F 11/30

[52] U.S. Cl. ............................................ 395/750; 364/707

[58] Field of Search .................................... 395/750, 550; 364/707, 375; 365/226, 227, 228, 229

[56] References Cited

U.S. PATENT DOCUMENTS

| | | | |
|---|---|---|---|
| 3,955,185 | 5/1976 | Nishimura | 364/707 |
| 4,189,717 | 2/1980 | Takeuchi | 364/707 |
| 4,259,594 | 3/1981 | Fox | 364/707 |
| 4,339,809 | 7/1982 | Stewart | 395/750 |
| 4,539,641 | 9/1985 | Kawashimo et al. | 364/550 |
| 4,553,223 | 11/1985 | Bouhelier et al. | 395/750 |
| 4,598,383 | 7/1986 | Leach | 364/707 |
| 4,614,880 | 9/1986 | Go et al. | 364/707 |
| 4,631,418 | 12/1986 | Toyomura | 395/750 |
| 4,768,162 | 8/1988 | Nishimura | 395/750 |
| 4,799,185 | 1/1989 | Taylor | 365/229 |
| 4,905,187 | 2/1990 | Beyers, Jr. | 364/707 |
| 5,167,024 | 11/1992 | Smith et al. | 364/375 |
| 5,182,810 | 1/1993 | Bartling et al. | 395/750 |
| 5,218,704 | 6/1993 | Watts, Jr. et al. | 395/750 |
| 5,230,074 | 7/1993 | Canova, Jr. et al. | 395/750 |

FOREIGN PATENT DOCUMENTS

| | | | |
|---|---|---|---|
| 58234506 | 7/1985 | Japan | 364/707 |
| 2-4221 | 1/1990 | Japan . | |

*Primary Examiner*—George B. Davis
*Attorney, Agent, or Firm*—Antonelli, Terry Stout & Kraus

[57] ABSTRACT

A data processing apparatus which includes a display unit and a power supply controller for supplying power to the display unit. The display unit has a display screen and a back light controller. The power supply controller comprises a switch, at least one output line for receiving the power from the switch and for supplying therethrough the power to electronic devices, a delay circuit for receiving the power from the switch and when the switch is turned ON to start supply of the power, for outputting the power after passage of a predetermined time from the start of the power supply, and a second output line for supplying the power from the delay circuit to the back light controller therethrough. The display unit has a memory means for storing therein a luminance data on the display screen through the back light controller when the power supply is turned OFF and for determining an output state of the display unit through the back light controller on the basis of the luminance data read out from the memory means when the power supply is turned ON. Further, the data processing apparatus has a means for invalidating output of a display data to be output onto the display screen and a means, after the display data is invalidated, for reducing a frequency of a timing signal or invalidating output of the timing signal for the display unit.

9 Claims, 16 Drawing Sheets

FIG. 2
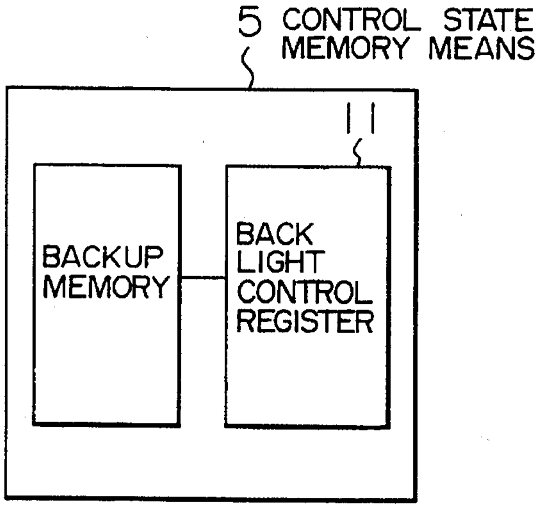
FIG. 3
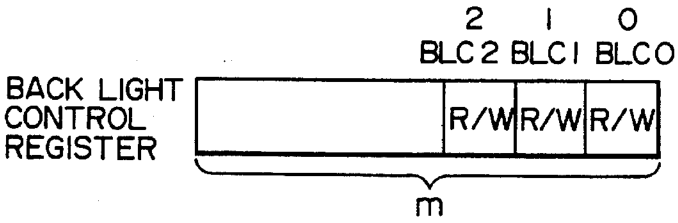
FIG. 4
| LEVEL | OUTPUT SIGNAL | | | BACK LIGHT STATE |
|---|---|---|---|---|
| | BLC 2 | BLC 1 | BLC 0 | |
| 0 | 0 | 0 | 0 | BACK LIGHT OFF |
| 1 | 0 | 0 | 1 | BACK LIGHT ON (DARK) |
| 2 | 0 | 1 | 0 | |
| 3 | 0 | 1 | 1 | |
| 4 | 1 | 0 | 0 | |
| 5 | 1 | 0 | 1 | |
| 6 | 1 | 1 | 0 | |
| 7 | 1 | 1 | 1 | (BRIGHT) |

| # | BACK LIGHT BRIGHTNESS | OUTPUT A | OUTPUT B | OUTPUT C |
|---|---|---|---|---|
| 0 | OFF | 0 | 0 | 0 |
| 1 | DARK | 0 | 0 | 1 |
| 2 | ↑ | 0 | 1 | 0 |
| 3 | ON | 0 | 1 | 1 |
| 4 | | 1 | 0 | 0 |
| 5 | | 1 | 0 | 1 |
| 6 | ↓ | 1 | 1 | 0 |
| 7 | BRIGHT | 1 | 1 | 1 |

DATA PROCESSING APPARATUS, POWER SUPPLY CONTROLLER AND DISPLAY UNIT

BACKGROUND OF THE INVENTION

The present invention generally relates to a data processing apparatus and a power supply controller.

These years, since a strong demand is directed to making small data processing apparatuses (data processors) in size and thickness, a liquid crystal type display has been recently increasingly employed as a display.

In some of such data processing apparatuses, for the purpose of improving the miniaturization and operating convenience, the back light brightness is set on a software basis.

Further, for the purpose of lengthening the operating time of a battery to meet a cordless demand, there have been suggested various devices to suppress consumption power.

In a liquid crystal back light controller disclosed in, for example, JP-A-2-4221, a light receiving hole having an opening is provided in the liquid crystal display side of a liquid crystal holder, a light receiving element for sensing visible light is provided at the bottom of the light receiving hole, and a controller is provided for controlling the turning ON and OFF of back light on the basis of an output signal of the light receiving signal to control the back light.

Further, it has been conventionally common practice to supply power to respective devices built in a single unit at the same time.

This will be detailed by referring to FIG. 13. The drawing shows waveforms of a consumption current for a back light and a consumption current for other devices of the system as well as a total of these two consumption currents with respect to the ON and OFF states of a power supply switch, with ordinate axis denoting consumption current and abscissa axis denoting time.

As will be appreciated, since the supply of power to the back light and the supply of power to the other devices are started at the same time in the prior art, the peak values of these consumption currents take place at the same time. This results in that a maximum peak current $I_{pl}$ corresponding to a total of these consumption currents becomes $(I_{pb}+I_{pd})$ (where $I_{pl}$ denotes the maximum peak value of the total consumption current in the prior art, $I_{pb}$ denotes the peak consumption current value for the back light, and $I_{pd}$ denotes the peak consumption current value for the other devices), which is very large.

SUMMARY OF THE INVENTION

It is an object of the present invention to provide a small and light-weight power supply controller which can suppress the peak value of a consumption current immediately after a power supply is turned ON to thereby reduce the capacity of the power supply with the small consumption current, and also to provide a data processing apparatus (data processor) incorporating the power supply controller.

Another object of the present invention is to provide a back light controller which, when a power supply is turned OFF and again turned ON, can automatically set a brightness state of back light which has been used when the power supply is turned OFF, and also to provide a data processing apparatus incorporating the back light controller.

A further object of the present invention is to provide a data processing apparatus which, when a consumption current is reduced, can prevent disturbance on a display screen causing an operator's uncomfortable feeling.

As the display of a data processing apparatus, recently, a large-sized, bright and easy-to-see display has been demanded. To this end, the display part occupies 10–40% of the overall power consumption of the entire data processing apparatus. As a large, high-brightness display appears in the market in the future, it is estimated that the power consumption ratio of the display to the entire data processing apparatus will increase.

Under such circumstances, the present invention has been made and intends to realize a data processing apparatus which can realize the reduction of the capacity of a power supply, whereby a power supply controller and thus the data processing apparatus can be made small in size and weight and an operator can easily handle the data processing apparatus.

The display will be explained in the following in connection with a liquid crystal display as an example.

In the prior art data processing apparatus, when the operator turns OFF the power in order to set the brightness of back light on a software basis, this causes the software to be reset. Thus, when the operator again turns ON the power, this causes the brightness to be automatically set at its initial value. For this reason, it has been necessary for the operator to set a desired back light brightness level each time the power is turned ON.

Further, in the prior art data processing apparatus, it is possible to control the battery power supply according to such application environments as ambient light sources or the angle of the liquid crystal display panel to realize less power consumption. However, any consideration has not been paid to the peak current immediately after the turning ON of the power. Thus, the capacity of the power supply and the peak current at the time of turning ON the power must be considered in design, which involves the increase of the power capacity and thus impedes realization of a small-size, light-weight data processing apparatus.

In accordance with the present invention, there are provided, when power is turned OFF and again turned ON to set a back light brightness on a software basis, a liquid crystal back light controller which automatically sets a brightness state of back light which has been used when power is turned OFF, and also a data processing apparatus incorporating the liquid crystal back light controller.

In the present invention, there are provided a power supply controller which can suppress the peak value of a consumption current immediately after turning ON of power to realize reduction of a power capacity, and also a data processing apparatus incorporating the power supply controller.

In the present invention, there are provided a power supply controller in which a power supply can be made small to suppress its heat dissipation while allowing easy cooling and also a data processing apparatus incorporating the power supply controller.

In accordance with an aspect of the present invention, there is provided a display unit which comprises a liquid crystal display, illumination means for changing brightness of the liquid crystal display, memory means for detecting an output state of the illumination means when a power supply is turned OFF and storing the output state therein as a luminance data, and illumination control means, when the power supply is turned ON, for reading out the luminance data stored in the memory means and determining the brightness of the illumination means in association with the luminance data.

Further, there is provided a data processing apparatus which comprises the liquid crystal display unit.

In accordance with another aspect of the present invention, there is provided a power supply controller for supplying power to a plurality of electronic devices, which controller comprises a switch for switching between turning ON and OFF of power of the entire power supply controller, at least one first output line for supplying the power supplied from the switch to the plurality of electronic devices therethrough, delay means for receiving the power through the switch, when the switch is turned ON to start supplying the power, for outputting the power after passage of a predetermined time from the start of the power reception, and at least one second output line for supplying the power from the delay means to another electronic device other than the plurality of electronic devices therethrough.

Furthermore, there is provided a data processing apparatus which comprises the power supply controller, the plurality of electronic devices supplied with the power through the first output line, and the liquid crystal display for receiving the power through the second output line.

In accordance with a further aspect of the present invention, there is provided a power supply controller for controlling supply of power to electronic devices, wherein the electronic devices are divided into a plurality of groups and the supply of power to the plurality of groups is started at timings different with respect to the groups.

In the present invention, the memory means stores therein a brightness of the illumination means at the time of turning OFF the power as a luminance data. When the power is turned ON, the control means reads out the luminance data from the memory means. And the control means controls the illumination means on the basis of the luminance data to adjust a brightness to be provided to the liquid crystal display at its original level.

Explanation will be made as to other aspects. When the switch is turned ON, the power supply is immediately started through the first output line. On the other hand, the delays means delay the start of power supply through the second output line by a predetermined time. Accordingly, the start of the power supply to such a device as a liquid crystal display through the second output line is delayed by the predetermined time than the start of the power supply to another device through the first output line. Thus, when the power is turned ON, the current peak of the device connected to the first output line does not take place simultaneously with the occurrence of the current peak of the device connected to the second output line. In the event where the data processing apparatus incorporates such a magnetic memory as a magnetic disk, power may be supplied to the magnetic memory through the delay means. Further, the timing of starting the power supply may be carried out in a more-than-two-stage manner.

As has been explained above, when the power is turned OFF and again turned ON, since the present invention automatically sets the brightness state which has been used at the time of turning OFF the power, the need for again setting the back light brightness after turning ON of the system can be eliminated, thus improving its handling convenience.

Further, since competition in consumption current peak between a plurality of devices immediately when the power is turned ON to start the system can be avoided, the capacity of the power supply can be made small. In addition, heat dissipation can be reduced due to the reduction of the capacity of the power supply, so that, when a data device incorporating the power supply controller is designed, its cooling restrictions can be lightened, whereby the whole system can be miniaturized.

As has been explained above, the present invention can realize the reduction of the capacity of the power supply and the improvement of its handling convenience. When the invention which is explained below is used, further excellent effects can be attained.

That is, in the present invention, for the purpose of reducing the capacity of a power supply to realize less power consumption, the display data signals or the display clock signals to be sent to a flat display are invalidated and the power supply to the flat display is stopped to realize the further reduction of the power consumption. When the frequency of the display timing signals is reduced or the output of the timing signals is invalidated, this is carried out after the output of the display data is invalidated to avoid the operator from seeing disturbance on the display screen.

In addition, there is provided a power supply controller which controls the consumption current of the entire system immediately when the power is turned ON to start the system to thereby reduce the capacity of a power supply.

In accordance with the present invention, the above object is attained by providing a liquid crystal display, illumination means for changing a brightness to be provided to the liquid crystal display, means for invalidating output of a display timing signal and display data to be sent to the liquid crystal display, means for controlling timing of invalidating the output of the display data, and means for controlling supply of power from a power supply to a plurality of electric devices, a logical circuit part and a display part which form a system.

Further, the power control/supply means for suppressing power consumption at the time of turning ON the power as well as the means for invalidating the display timing signals and display data to be supplied to the liquid crystal display enable the control of the consumption current peak of the back light and the consumption current peak of the electronic devices of the system and also enables the control of the consumption power of the liquid crystal display, which results in that the capacity of the power supply can be reduced. In addition, when the frequency of the display timing signals is reduced or the output of the display timing signals is invalidated, this is carried out always after invalidation of the output of the display data, thus avoiding any disturbance on the display screen.

The present invention has the following advantages.

Since the peak of the consumption current of a plurality of devices or the frequency of the display clock to be sent to the liquid crystal display is reduced or invalidated or the display data is invalidated immediately when power is turned ON to start the system, the capacity of the power supply of the system can be reduced.

In the absence of any key input, the brightness of the back light is lowered and the output of the timing signals and display data to be sent to the display is invalidated, whereby the power consumption can be minimized. Further, since the capacity of the power supply of the system can be reduced, the system can be made small in size.

BRIEF DESCRIPTION OF THE DRAWINGS

FIG. 2 is a block diagram of an arrangement of a control state memory means;

FIG. 3 shows a data bit structure of a back light control register;

FIG. 4 shows a correlative relationship between the data set value of the back light control register and the brightness of back light;

DESCRIPTION OF THE PREFERRED EMBODIMENTS

Embodiments of the present invention will be explained with reference to the accompanying drawings.

Figure 1:
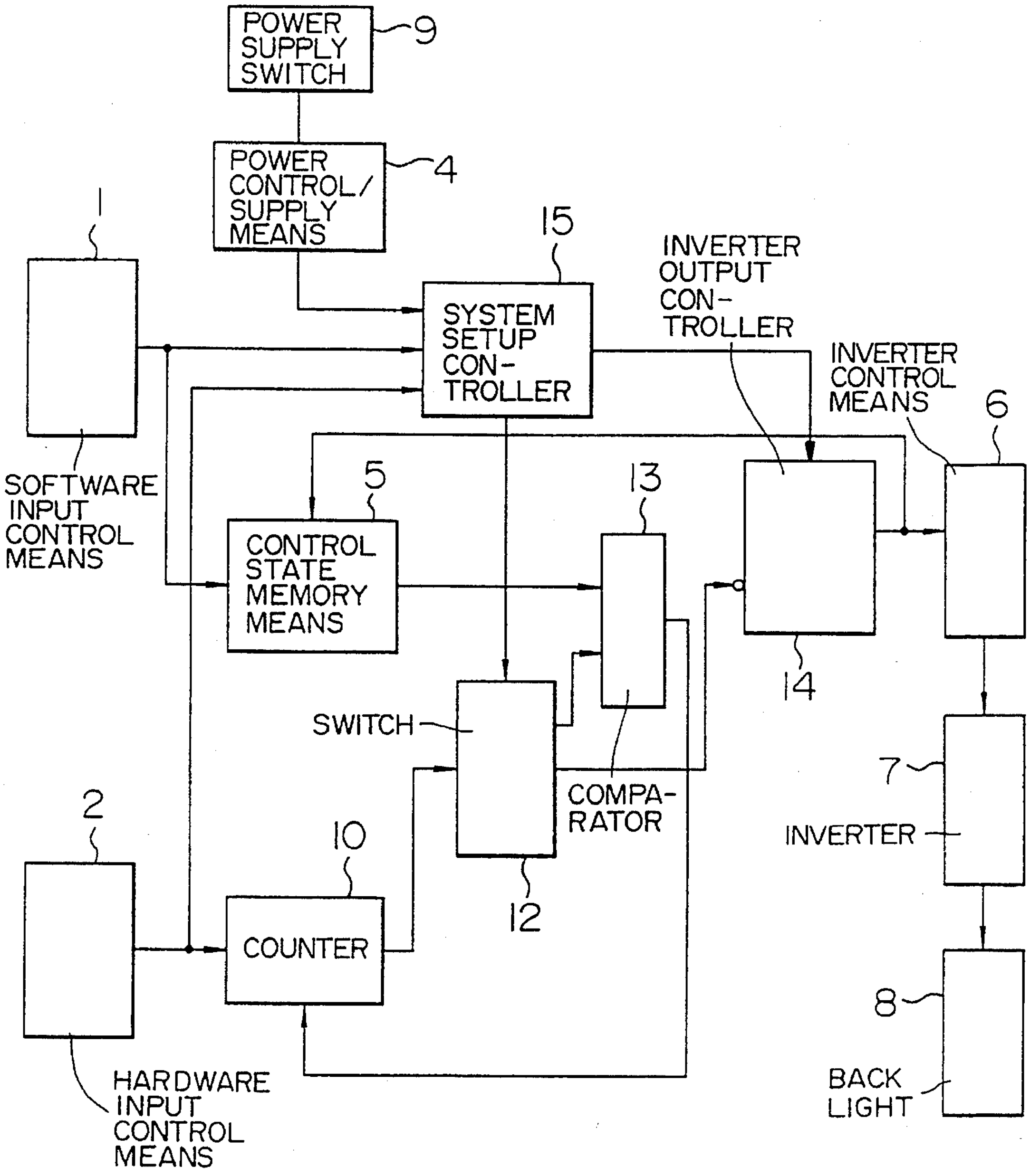
FIG. 1 is a block diagram of a hardware configuration in accordance with an embodiment of the present invention.

Referring first to FIG. 1, there is shown a block diagram of a hardware configuration of a part of a data processing apparatus of the present embodiment associated with the back light control of a liquid crystal display panel.

In the present embodiment, a back light means 8 is controlled by a hardware configuration which comprises a software input/control means 1, a hardware input/control means 2, a power control/supply means 4, a control state memory means 5, an inverter control means 6, an inverter 7, a power supply switch 9, a counter 10, a switch 12, a comparator 13 and a system setup controller 15.

More specifically, the software input/control means 1 having a resume function, issues, when power is turned ON, a predetermined command to the control state memory means 5 and the system setup controller 15.

The control state memory means 5, as shown in FIG. 2, has a backup memory and a back light control register 11. Data or the like on the brightness of the back light are stored in the back light control register 11 and the backup memory. And when power is turned ON, these data are output to the comparator 13. These data are rewritten when the control state memory means 5 receives an output of the inverter output controller 14, but in a power cut-off state, the brightness at the time of cutting off the power is held in the memory. The back light control register 11 will be detailed later.

The hardware input/control means 2 has a function of accepting a brightness adjustment from a user. In more detail, the hardware input/control means 2 accepts an input for brightness adjustment from a keyboard or the like and outputs it to the counter 10 to be explained later. In this connection, an input key for the brightness adjustment may comprise a combination of an ordinary character key and a special key or may comprises an exclusive key.

The counter 10, which comprises, for example, an up/down counter, has a function of counting an input for the brightness adjustment of the back light received from the hardware input/control means 2. When power is turned ON, the contents of the counter 10 is rewritten on the basis of an input received from the comparator 13. The data stored in the counter 10 is output to the switch 12.

The switch 12 has a function of issuing a data indicative of a brightness from the counter 10 and the control state memory means 5 to the comparator 13 and the inverter output controller 14. That is, when power is turned ON, the switch 12 outputs the signal from the counter 10 to both of the comparator 13 and the inverter output controller 14. However, once a brightness adjustment input is provided through the hardware input/control means 2, the system setup controller 15 detects the input and controls the switch 12 in such a manner that the contents of the counter 10 is output only to the inverter output controller 14.

When power is turned ON, the comparator 13 has a function of comparing the contents of the control state memory means 5 with the contents of the counter 10 and rewriting the contents of the counter 10 based on the comparison result. In other words, the comparator 13 changes the contents of the counter 10 until the contents of the counter 10 becomes the same as the contents of the control state memory means 5. As a result, the data processing apparatus of the present embodiment can reproduce the brightness stored in the control state memory means 5, i.e., the brightness at the power cut-off time when power is turned ON.

As already explained above, in the present embodiment, the control of brightness of the back light is carried out on the basis of two lines, i.e., a line including software input/control means 1 and a line including the hardware input/control means 2. However, these lines are not contradictive to each other but merely share the role of back light brightness control as mentioned above.

The inverter output controller 14 has functions of controlling an output to the inverter control means 6 and also on occasion, rewriting the brightness data stored in the control state memory means 5.

The system setup controller 15, when the system is turned ON, detects the presence or absence of outputs from the software input/control means 1, the hardware input/control means 2 and the power control/supply means 4 and controls the other parts on the basis of the detection result. For example, after power is turned ON, the system setup controller 15, when detecting an input from the hardware input/control means 2, controls the switch 12 in such a manner that the output signal of the counter 10 is sent only to the inverter output controller 14 while the supply of the output signal of the counter 10 to the comparator 13 is stopped.

The system setup controller 15 of the present embodiment further has a function of controlling the power turning-ON timing to the back light means 8 in cooperation with the power control/supply means 4 and the inverter output controller 14, which will be explained later.

Explanation will be made as to the back light control register 11 by referring to FIGS. 3 and 4.

The back light control register 11 comprises m bits and has 3 data bits in the present embodiment, whereby n states (2 to the m-th power) can be specified. Accordingly, when these states are associated with brightness stages as shown in FIG. 4, the brightness of the back light can be controlled on an n stage basis and in the present embodiment, on an 8 stage basis.

Figures 5, 6:
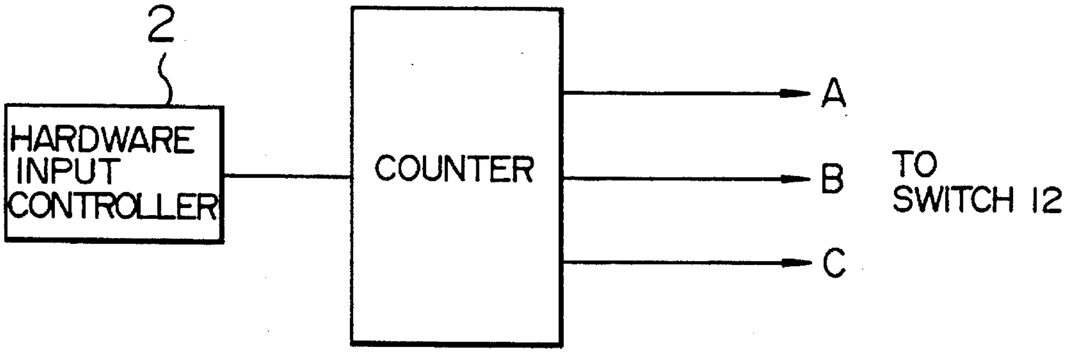
FIG. 5 Is a block diagram of a counter and its peripheral part.
FIG. 6 shows a correlative relationship between the output value of the counter and the brightness of the back light.

Explanation will next be made as to the counter 10 by referring to FIGS. 5 and 6.

When receiving an input from the hardware input/control means 2, the counter 10 in the present embodiment outputs parallel signals onto parallel output lines corresponding in number to the number of data bits in the aforementioned back light control register 11. In other words, the respective signal lines correspond to the respective data bits of the pack light control register 11 in a 1:1 relation.

The structure and data length of the illustrated back light control register 11 and counter 10 are given merely as an example and it will be easily appreciated that the present invention is not limited to the specific example.

Explanation will then be made as to how to change the brightness of the back light.

When power is turned OFF, the back light brightness data already written in the control state memory means 5 by the inverter output controller 14 is held in the backup memory.

Thereafter, when power is turned ON, the software input/control means 1 causes the power-off brightness data of the back light means 8 in the memory of the control state memory means 5 to be written into the back light control register 11 and then to be output to the comparator 13.

The system setup controller 15, when detecting 25, the operation of the software input/control means 1, controls the switch 12 to cause the outputs of the counter 10 to be sent to both the inverter output controller 14 and the comparator 13.

The comparator 13 in turn, compares an input from the control state memory means 5 with one output value of the counter 10 received through the switch 12. And on the basis of the comparison result, the comparator 13 changes the value of the counter 10 in such a manner that the value of the counter 10 becomes the same as the data received from the control state memory means 5, that is, the same as the data at the power cut-off time.

During the above operation, the inverter output controller 14 modifies the brightness of the back light means 8 according to the output signal of the counter 10 received from the switch 12. As a result, the brightness of the back light means 8 is adjusted to have the same brightness as at the power cut-off time.

Figure 7:
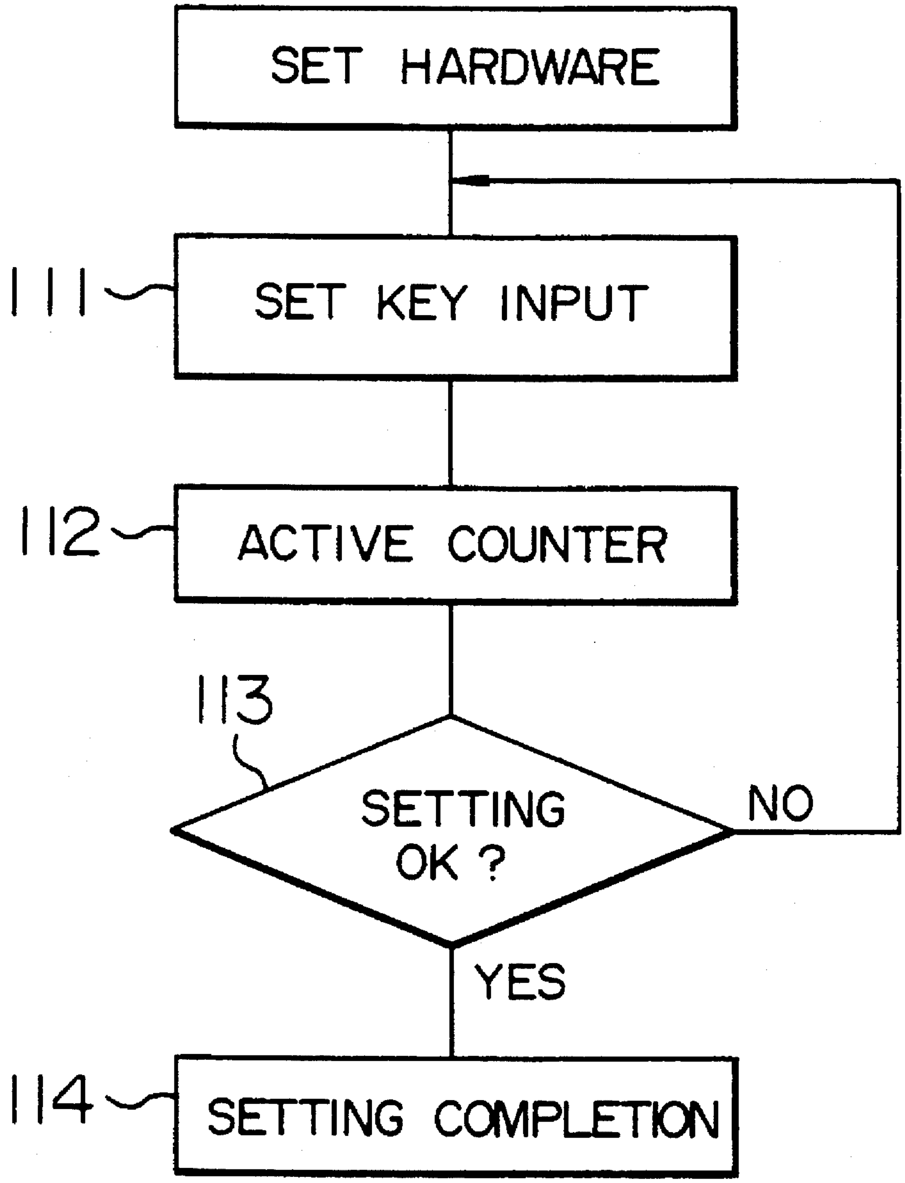
FIG. 7 is a flowchart for explaining the brightness setting operation of a hardware input/control means.

On the other hand, modification in the brightness during the operation of the data processing apparatus is carried out on the basis of an input from the hardware input/control means 2, which will be explained by referring to a flowchart of FIG. 7.

An operator operates the hardware input/control means 2, for example, a keyboard to enter a brightness change command to the counter 10 (step 111). Then this causes the system setup controller 15 to detect it and to stop the output from the switch 12 to the comparator 13.

This results in that the value of the counter 10 cannot be modified by means of the control state memory means 5 and the comparator 13. Instead, the value of the counter 10 is modified on the basis of an input received from the hardware input/control means 2 (step 112). That is, the brightness of the back light means 8 is modified on the basis of the operator's input of the hardware input/control means 2. And when the operator confirms that the brightness was changed to a desired level (step 113), the brightness setting operation is completed (step 114).

How to control the timing of power turning 0N of the back light means 8 will be explained.

The system setup controller 15 in the present embodiment, in addition to the aforementioned function, has a function of, when the system is turned ON, accepting a power supply sequence data at the time of setting up other devices of the data processing apparatus from the power control/supply means 4 and judging, on the basis of the accepted data, whether or not the system is turned ON based on the turning ON of the power supply switch 9. If so, then the system setup controller 15 delays the power turn-on timing to the back light 8 as compared to the other devices.

This results in that, when the system is turned ON immediately after the turning ON of power, a competition can be avoided between a consumption current necessary for the setup of other devices and a consumption current necessary for the back light to suppress its total peak current.

The operation of the present invention has been explained separately with regard to the brightness adjustment of the back light means 8 and with regard to the power turn-on timing adjustment, but the operation of the present invention will next be explained as a series of operations.

Figure 8:
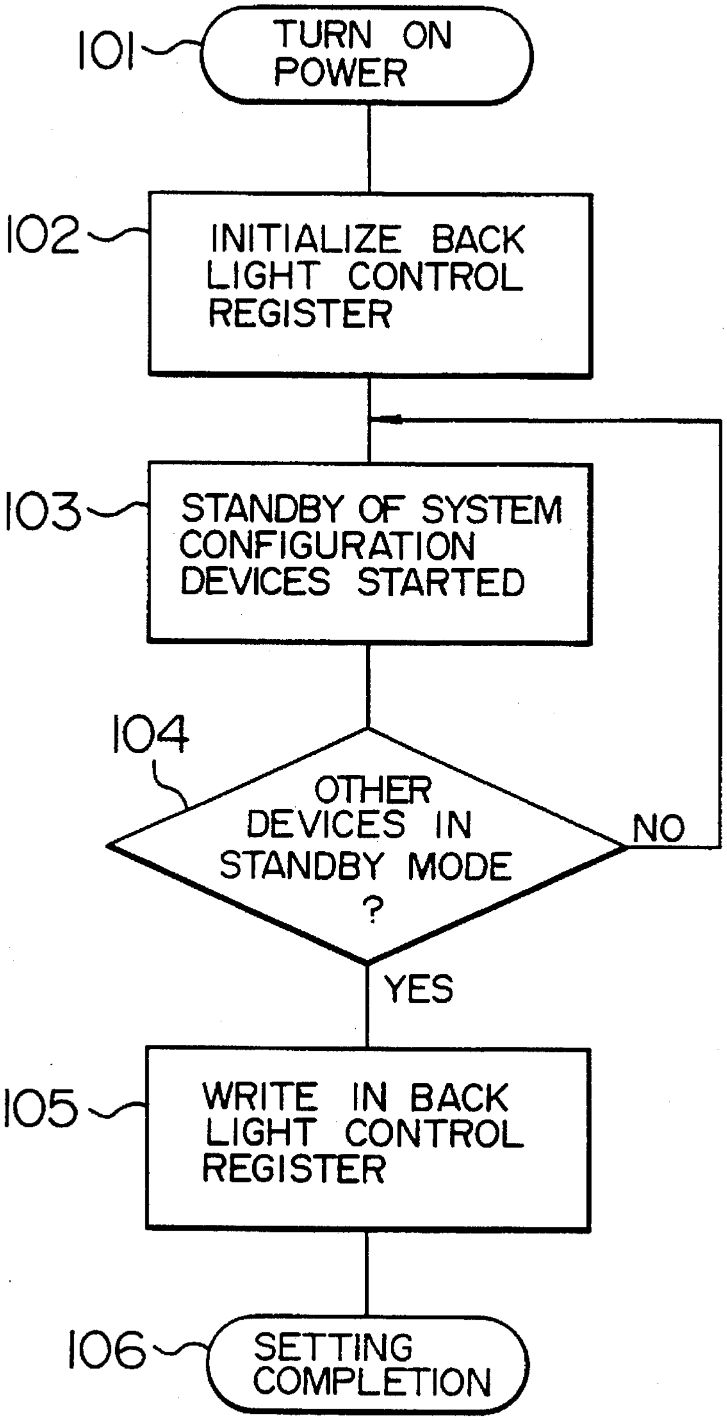
FIG. 8 is a flowchart for explaining the general operation of the present embodiment.

FIG. 8 shows a flowchart for explaining the brightness setting operation of the back light when power is turned ON.

After power is turned ON, the back light control register 11 within the control state memory means 5 is automatically reset at zero (initial value), whereby the brightness of the back light is set at a dark level (step 101).

The power control/supply means 4 controllably turns ON other devices to put them in their standby state (step 103). When the power control/supply means 4 confirms that other devices, e.g., a hard disk or a floppy disk was put in its standby state (step 104), the back light brightness state already stored in the control state memory means 5 is written into the back light control register 11 (step 105), at which stage the brightness setting operation is completed (step 106).

As already explained above,in the present embodiment, even after power is turned ON, the brightness of the back light means 8 can be set to have the same level as when power is turn OFF. Further, since the peak current is suppressed by adjusting the power turning-on timing to the back light means 8, the entire power capacity of the system can be made low and thus the miniaturization of the system can be realized.

Another embodiment of the present invention will be explained. The present embodiment is featured in that not only the brightness at the power turn-off time is reproduced but also the set value of the back light control register 11 can be rewritten by means of the software input/control means 1 to automatically modify the brightness under control of an application program or the like.

Figure 9:
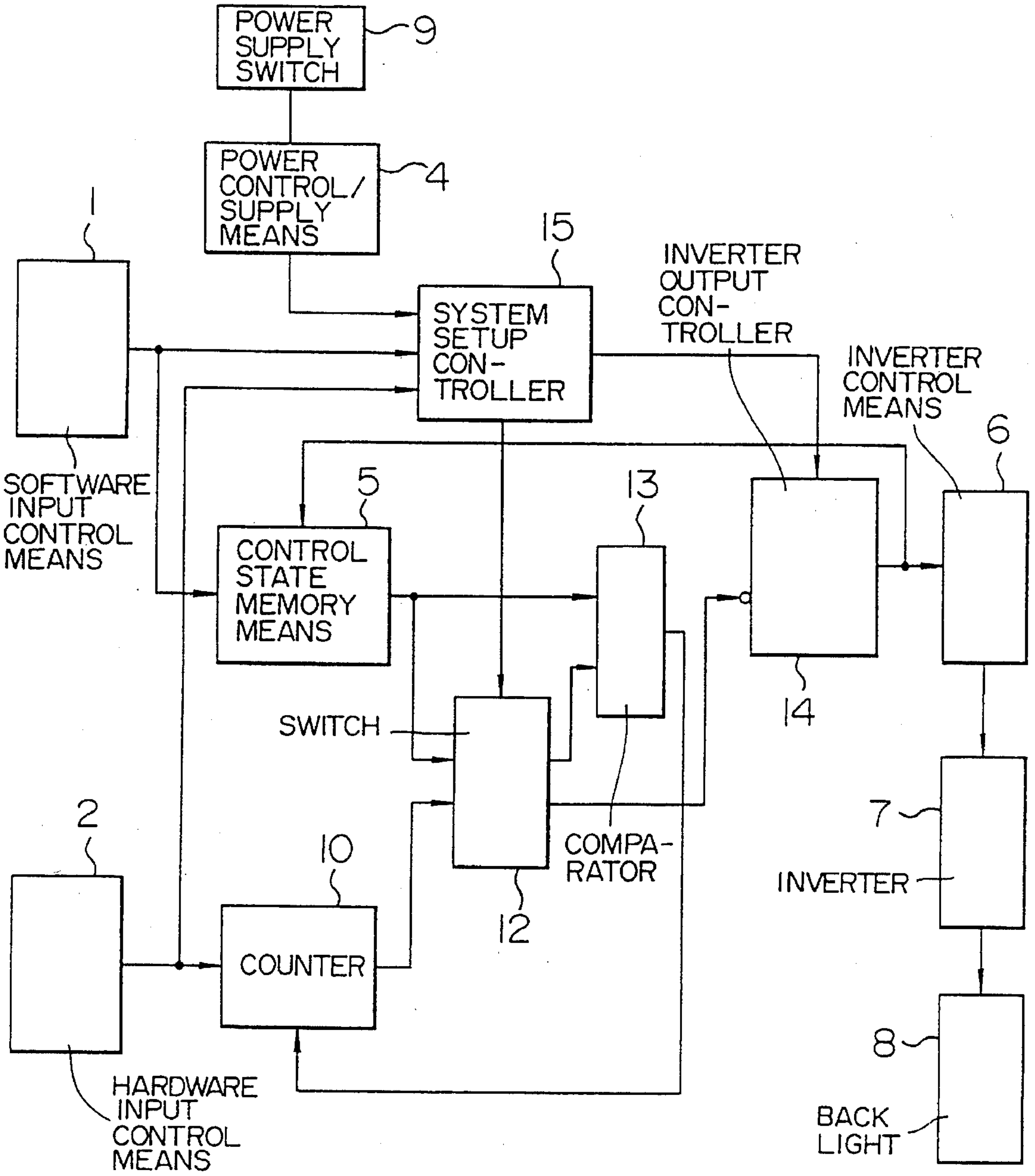
FIG. 9 is a block diagram of an arrangement of another embodiment.

Shown in FIG. 9 is an arrangement of the present embodiment, which basic arrangement is substantially the same as the foregoing embodiment, except-that the control state memory means 5, the switch 12 and the system setup controller 15 are different in function from those in the foregoing embodiment.

The back light control register 11 built in the control state memory means 5 can be rewritten by the software input/control means 1. Further, the contents of the back light control register 11 can be output to the inverter output controller 14 through the switch 12.

The system setup controller 15, when detecting the rewriting of the back light control register 11 by the software input/control means 1, informs the switch 12 of it to perform a brightness modification.

The switch 12 selectively accepts either one of the outputs of the control state memory means 5 and counter 10. When it is desired to modify the brightness through the software input/control means 1 during a time other than when power is turned ON, the switch 12 accepts the output of the back light control register 11 of the control state memory means 5 and outputs it to the inverter output controller 14. The operations when power is turned ON and when the brightness is set based on the hardware input/control means 2 are substantially the same as those in the foregoing embodiment.

The inverter output controller 14, when confirming that the back light control register 11 is in its rewriting operation under the software input/control means 1 on the basis of an input received from the system setup controller 15, is arranged not to rewrite the contents of the backup memory of the control state memory means 5 during the rewriting operation of the register 11. As a result, the data immediately before the rewriting of the back light control register 11 can be held. However, as necessary, the contents of the backup memory may be arranged to be rewritten even during the rewriting operation of the register 11.

Further provided in the present embodiment is a timer (not shown) which is activated in response to an input received from a keyboard. The timer is arranged, in the absence of an input from the keyboard for a time exceeding a predetermined time, to rewrite the value of the back light control register 11 to automatically provide dark back light. In this case, it is also possible to decode a data from the timer through a decoder into corresponding data bits for the back light control register 11 and to write them into the back light control register 11 according to time to thereby set back light brightness.

Further, when the upper bits (providing bright back light) of the back light control register 11 are set at zero or all the bits are set at zero for example, the back light can be instantaneously made dark. For example, in the event where the back light control register 11 has a 4-bit structure, if the upper two bits are set at zero, then the brightness can be set at a level corresponding to half of the brightest state. Furthermore, a given brightness may be set by means of a divider.

Figure 10:
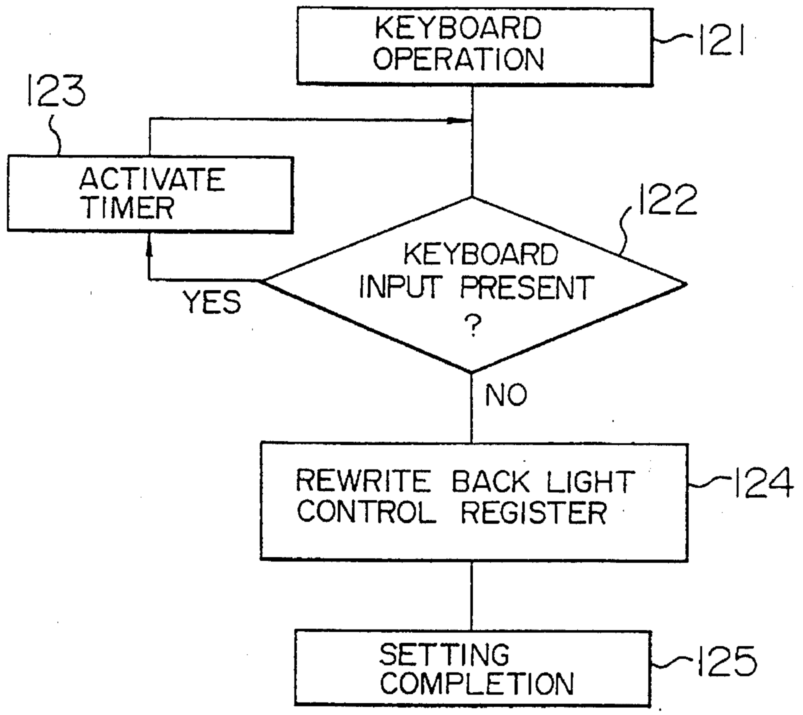
FIG. 10 is a flowchart for explaining the brightness changing operation of a software input/control means.

The brightness setting operation will be explained by referring to a flowchart of FIG. 10.

After the operations of devices are started, the presence or absence of an input from the keyboard is monitored (step 122). Each input from the keyboard causes the timer to be reset and restarted (step 123).

No keying operation is carried out on the keyboard for a time exceeding a predetermined time, this causes the contents of the back light control register 11 to be rewritten (step 124), whereby the brightness is changed to a desired level (step 125).

Thereafter, the presence of an input from the keyboard causes the data already held in the backup memory to be written into the back light control register 11 to reproduce the initial brightness.

Further, when power is turned OFF and then again turned ON, the brightness can be set always to have the same level as the back light at the power turning-off time.

Explanation will next be made as to a further embodiment of the present invention. The data processing apparatus of the present embodiment contains a power controller which can adjust the power turning-on timing.

Figure 11:
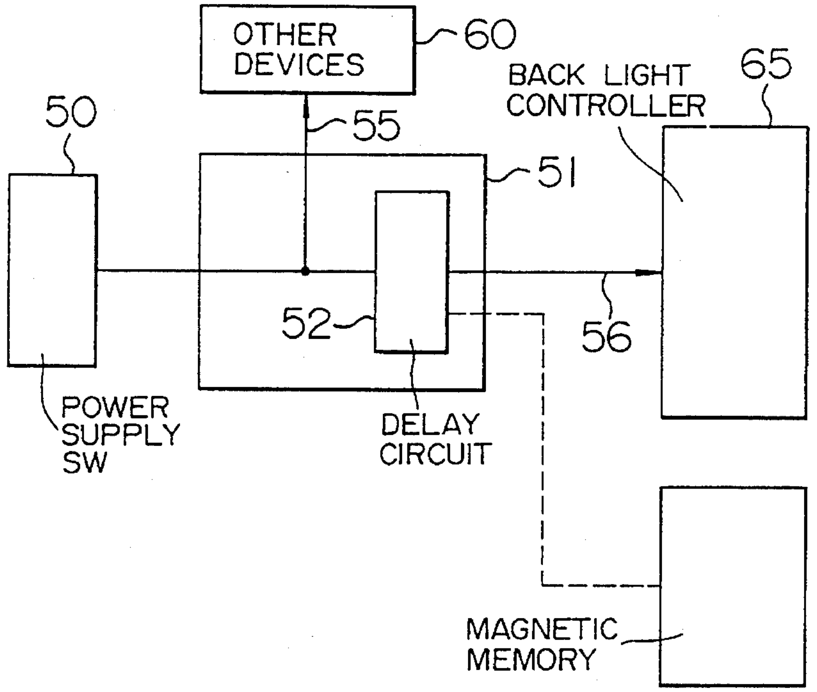
FIG. 11 is a block diagram of an arrangement of a further embodiment.

There is shown in FIG. 11 a block diagram of an arrangement of the present embodiment associated with the power supply control.

The power supply control part of the present embodiment includes a power supply switch 50, a power control circuit 51, a delay circuit 52, a back light controller 65 and other devices 60.

More specifically, the delay circuit 52 detects the power ON/OFF switching operation of the power supply switch 50 and when the system is turned ON, adjusts the power supply start timing to the back light controller 65. In the present embodiment, the delay circuit 52 first starts the supply of power to the other devices 60 via an output line 55 and thereafter starts the supply of power to the back light controller 65 via an output line 56. The setting of such power supply sequence is because it is substantially unnecessary to display any data on the display unit immediately after power is turned ON. Accordingly, only when an error takes place, it becomes necessary to inform the operator of the error occurrence by means of alarm. However, such sequence is not limited to the specific example but may be modified according to the object and arrangement of the system. More concretely, the delay circuit 52 may comprise a timer or the like. However, the delay circuit 52 is not restricted to such a timer but may be made up of another suitable means. For example, a memory may be provided within the power control circuit 51 to store therein the power turning-on sequence of the respective devices and delay times therefor and to thereby turn on the respective devices in the stored order.

In operation of FIG. 11, the power supply switch 50 is operated to turn on the power. This causes the power control circuit 51 to start the supply of power to the other devices 60 via the output line 55, and also to start the supply of power to the back light controller 65 via the output line 56 having the delay circuit 56 therein. In this case, since the delay circuit 52 is operated, the start of the power supply to the output line 56 is delayed with respect to the start of the power supply to the output line 55. As a result, the current peak value of the whole devices when the system is turned ON can be suppressed.

The above operation will be more detailed with reference to FIG. 12.

Figure 12:
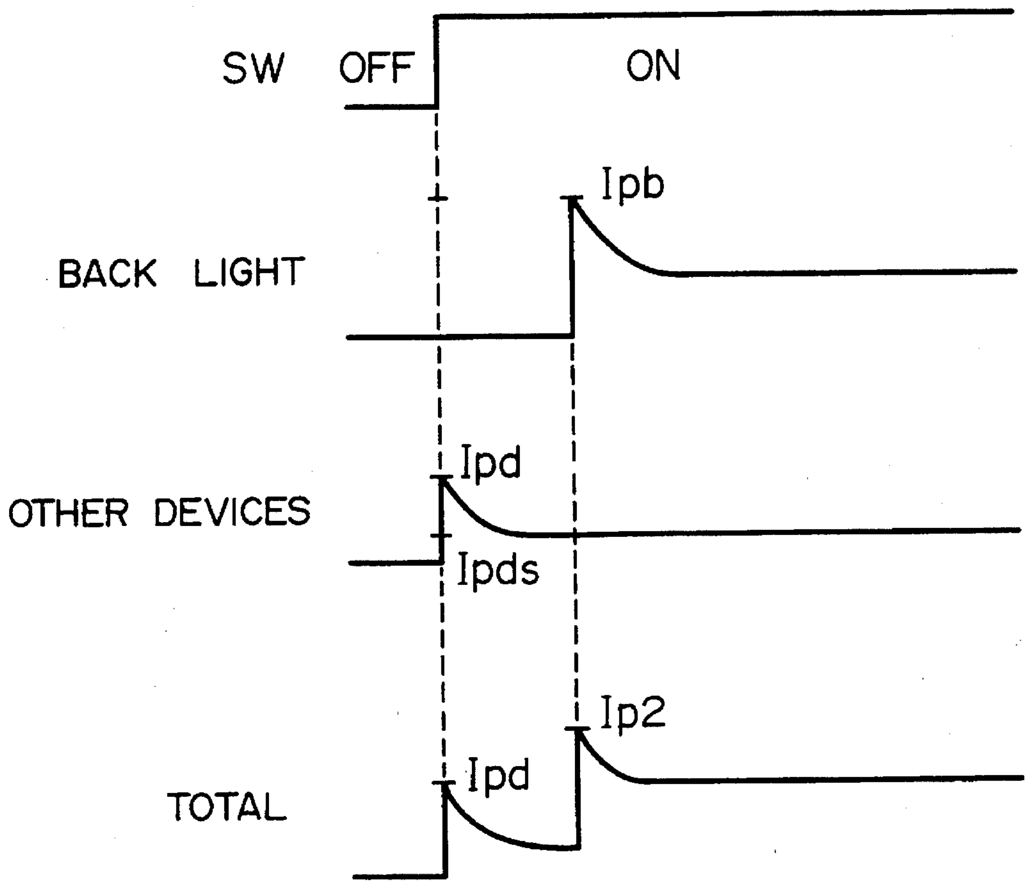
FIG. 12 is a sequential timing chart for power supply controlling the present embodiment.
Figure 13:
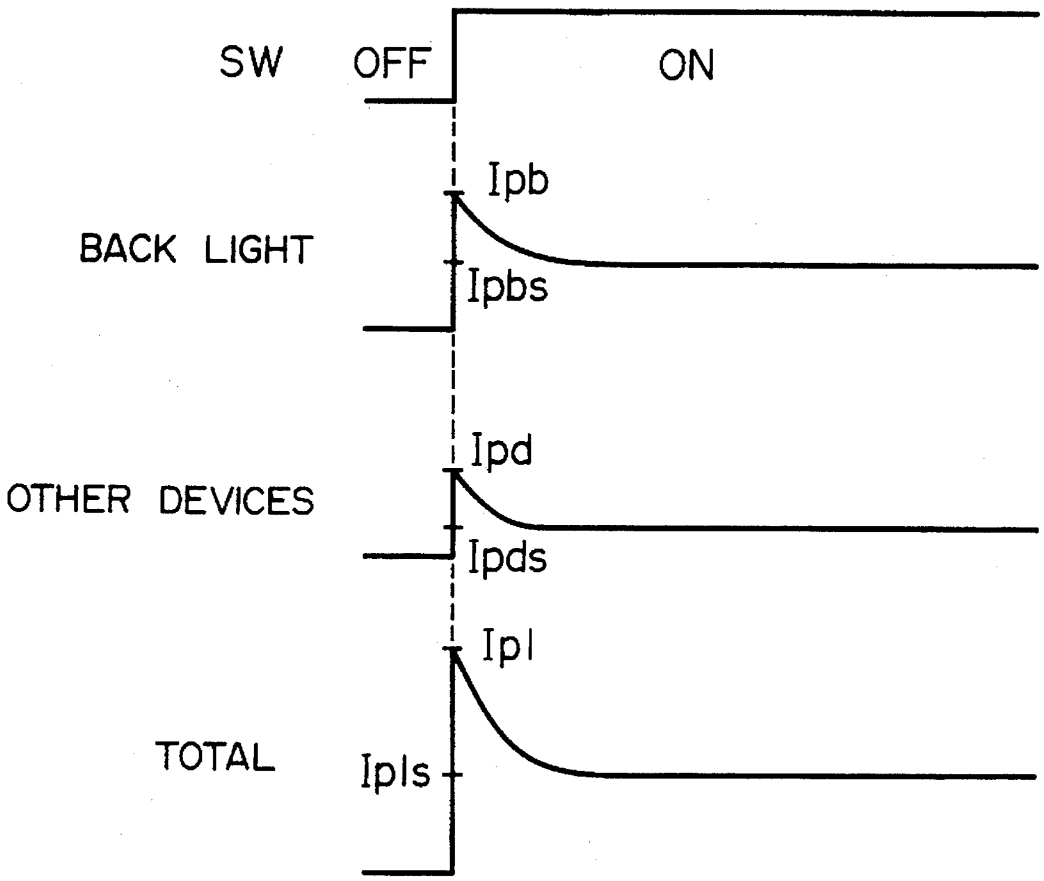
FIG. 13 PRIOR ART
FIG. 13 is a sequential timing chart for power supply control in a prior art.

FIG. 12 shows waveforms of consumption currents flowing through the back light controller 65 and the other devices 60 as well as a total of the two consumption currents with respect to the ON and OFF timing of the power supply switch. In the drawing, ordinate axis denotes consumption current and abscissa axis denotes time.

It will be seen from the drawing that power supply is carried out firstly to the other devices 60. Thereafter, whenthe current passes through its peak and decreases to its ordinary current level, the power supply to the back light controller 64 is started. For this reason, the peak current through the whole devices can be made small.

That is, when control is carried out so as to avoid competition in peak value between the consumption current of the back light controller 65 and consumption current of the other devices 60, a total maximum peak current $I_{p2}$ is $(I_{pb}+I_{pds})$ (where $I_{p2}$ is the consumption current value when the invention is at its peak and $I_{pds}$ is the consumption current value when the other devices are in the standby state) and thus the maximum peak current $I_{p2}$ can be made small.

Therefore, the maximum current value to be considered when the system is designed can be made small and thus the capacity of a power supply to be mounted in the system can be made low. Further, since the low capacity of the power supply provides less heat dissipation, cooling restrictions can be lightened when it is desired to make the devices compact.

Such consumption current control is not limited to the back light but also applied to such a display having a function of setting the brightness of its display as a CRT or a plasma display.

Further, the present invention is not restricted to the data processing apparatus but also may be applied to any electronic devices and the power supply start timing may be carried out in a more-than-two-stage manner, as a matter of course.

Figure 14:
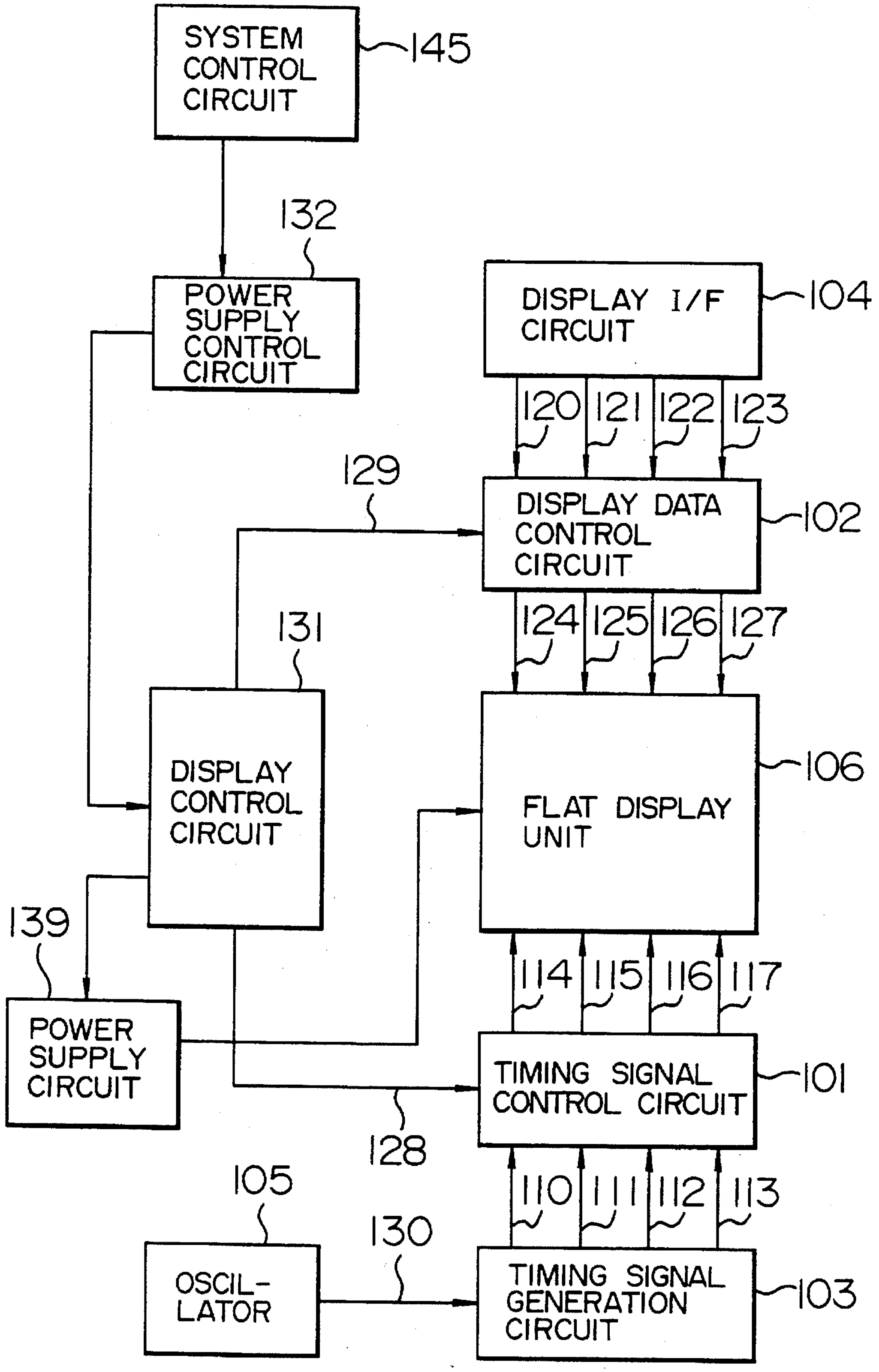
FIG. 14 is a block diagram of a hardware configuration of a system in accordance with yet a further embodiment of the present invention.

Referring to FIG. 14, there is shown a block diagram of a hardware configuration of a part of a low power capacity data processing apparatus associated with the control of a flat display in accordance with an embodiment of the present invention. FIG. 14 includes a timing signal control circuit 101; a display data control circuit 102; a timing signal generation circuit 103, a display I/F circuit 104; an oscillator 105; such a flat display 106 as a liquid crystal display unit; timing signals 110 to 117 for a display reference clock signal, a horizontal/vertical synchronization signal and a display blanking signal; display data 120 to 127 to be supplied such a flat display unit 106 as a liquid crystal display; a display clock OFF signal 128 for invalidating the output of the timing signals 110 to 117 or decreasing the timing signals; a display OFF signal 129 for fixing to "L" or "H" all bits of the display data 120 to 127 to be supplied to the flat display unit 106; a display clock signal 130 for the flat display or a CRT; a display control circuit 131 for controlling the validity/validity invaldity or the frequency reduction for the output of the display timing signals 110 to 117 and the fixations of "L" or "H" for the output of the display data 120 to 127; and a power supply control circuit 132 for realizing the reduction of the capacity of the power supply. More specifically, the timing signal control circuit 101 is operated to lower the frequency of the timing signals 110 to 113 corresponding to the flat display unit 106 and the outputs of the timing signal generation circuit 103 receiving the display clock signal 130 from the oscillator 105 or to suppress the outputs of the clock signal and the timing signals. The display data control circuit 102 controls the fixation to "L" or "H" of the display data 120 to 123 received from the display I/F circuit 104. This enables effective prevention of sticking of the liquid crystal display. The display control circuit 131 is operated, when the display data 124 to 127 are valid, not to invalidate the output of the timing signals 114 to 117 to prevent the display disturbance to the display screen. In a power supply circuit 139, the power supply to the flat display unit 106 is stopped after the display data 124 to 127 and the timing signals 114 to 117 are invalidated. Thus, the low power consumption of the device is realized by the stop of the power supply to the flat display unit 106 with no relevance to the states of the display data 120 to 127 and the timing signals 110 to 117. By using the system control circuit 145, power supply control circuit 132, when power is turned ON, adjusts the timing between the power supply to such a plurality of electric devices forming the system as, for example, a hard disk, a floppy disk and a display back light means and the power supply to the flat display unit 106 to avoid competition therebetween at the time of the maximum peak of the power supply, thereby making small the total current capacity and the capacity of the power supply of the system. The display control circuit 131 detects the initializing period and a key input wait time when the power supply of the data processing apparatus is turned ON and outputs the display clock OFF signal 128 and the display OFF signal 129 for display control.

Figure 15:
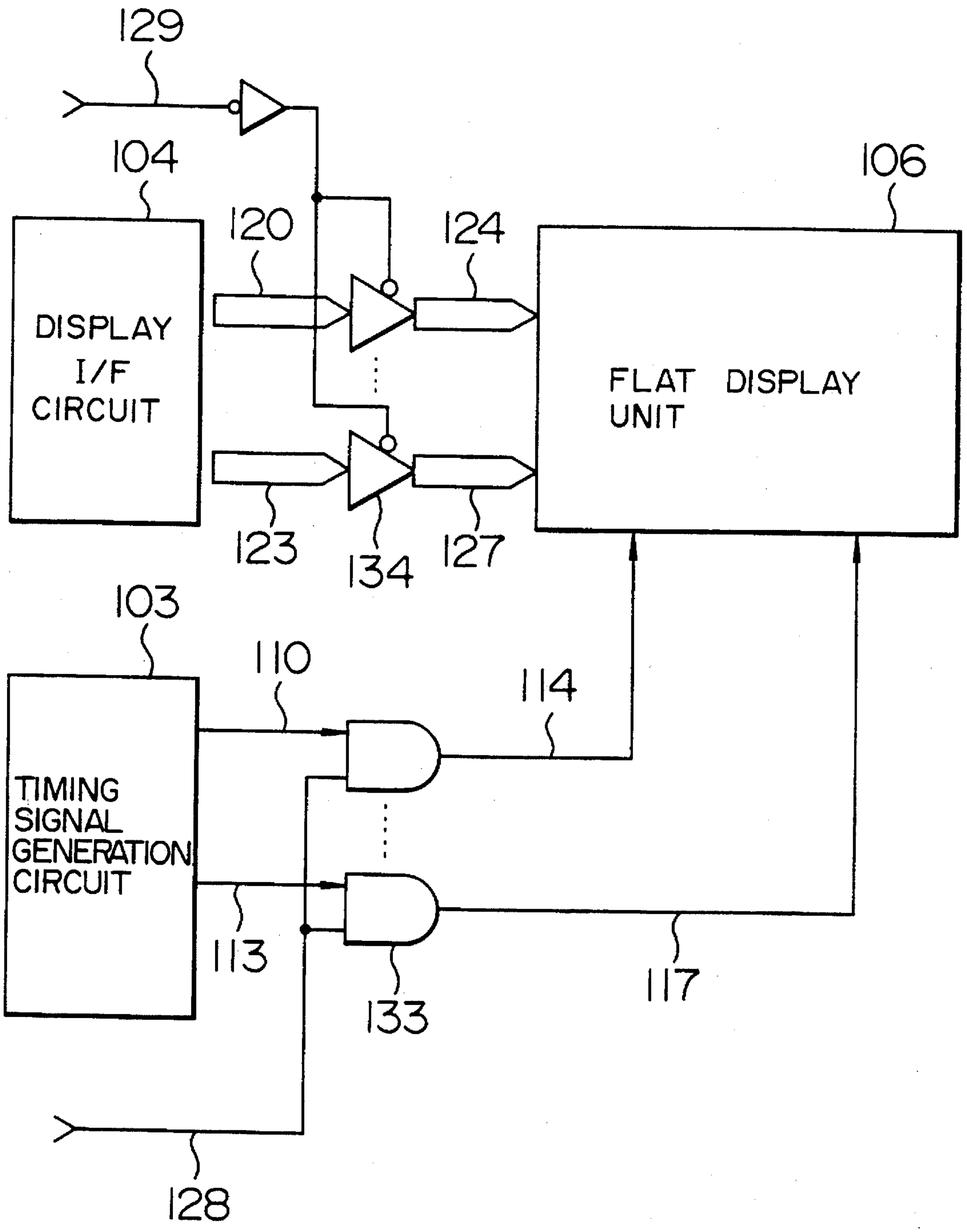
FIG. 15 shows details of a display data/timing signal control circuits.

FIG. 15 shows details of the display data/timing signal control circuits. Explanation will be made as to how to invalidate the timing signals 110 to 117 and the display data 120 to 127 in conjunction with this drawing as an example. In the drawing, reference numeral 133 denotes timing-signal invalidating gates for masking the timing signals. That is, when the display clock OFF signal 128 is at a level "L", the timing signals 110 to 113 are masked and invalidated. In this case, as the electric power is not supplied to the flat display 106 so that no voltage is applied to the transistor for supplying the voltage to the liquid crystal, the consumption power amount can be reduced. Reference numeral 134 denotes display data invalidating drivers for invalidating the display data 120 to 123. That is, when the display OFF signal 129 is at a level "L", the display data 120 to 123 are invalidated.

Figure 16:
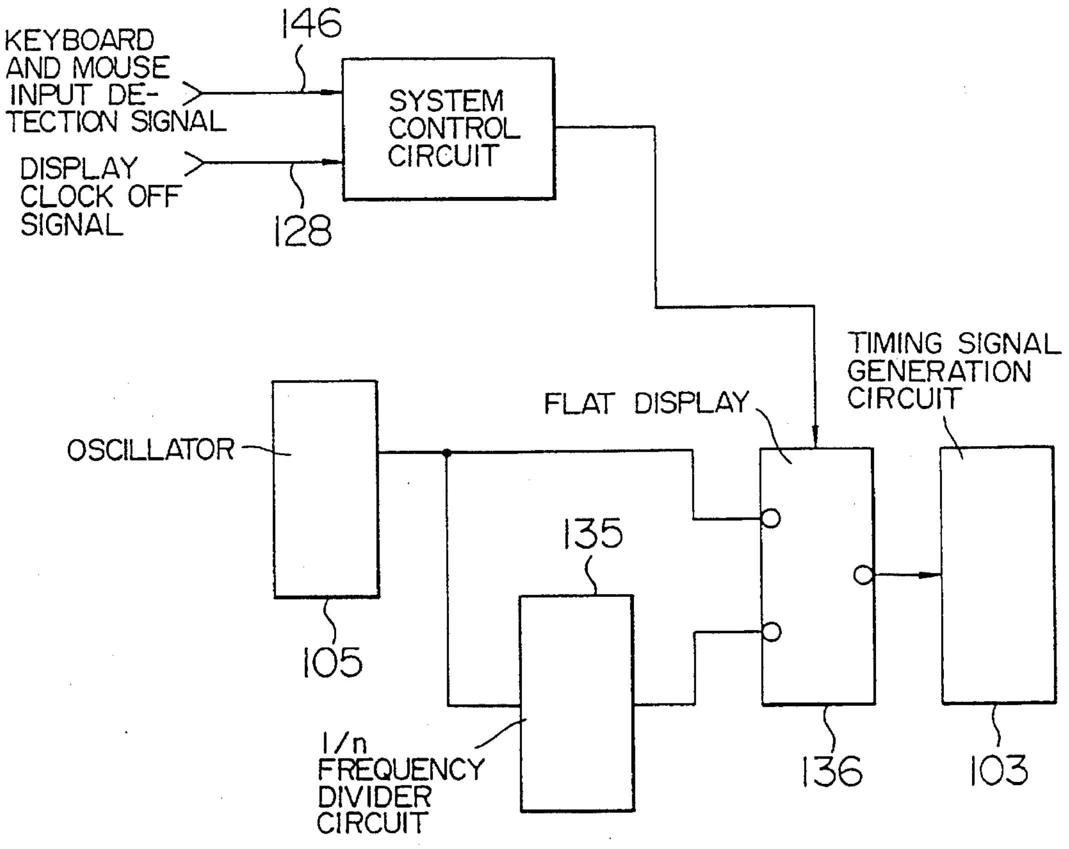
FIG. 16 is a block diagram of a timing signal control circuit.

Shown in FIG. 16 is a detailed block diagram of the timing signal control circuit when it is desired to reduce the frequency. In the drawing, reference numeral 135 is an 1/n frequency divider circuit for dividing the frequency of the clock signals from the oscillator 105 into 1/n (n: natural number). A timing signal selection circuit 136 selects, on the basis of the received display clock OFF signal 128 and the received detection signal 146 from the keyboard and/or the mouse, either one of the timing signals having the frequency reduced by the 1/n frequency divider circuit 135 and the original timing signals not subjected to the frequency reduction. The timing signal selection circuit 136 comprises a selector. When the display clock OFF signal 128 is at a level "L" and there exists no information from the keyboard, the mouse etc., the timing signal section circuit 136 selects the timing signals issued from the 1/n frequency divider circuit 135. In this way, such frequency reduction enables the reduction of the consumption power.

Figure 17:
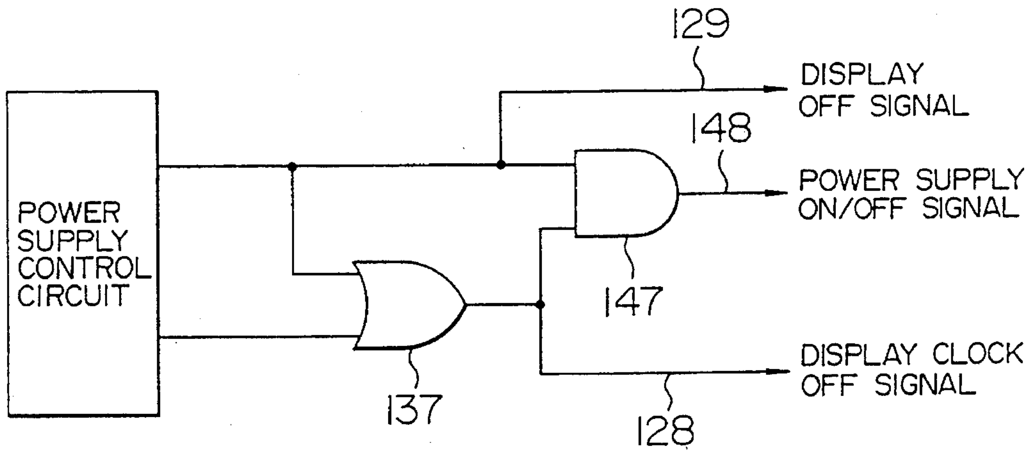
FIG. 17 is a block diagram of a display control circuit.

FIG. 17 shows a detailed block diagram of the display control circuit 131. In the drawing, when the display OFF signal 129 is at a level "H", that is, when the display data are valid, an OR circuit 137 masks the display clock OFF signal 128 or when the display data is valid, invalidates the display timing signals 114 to 117 or prevents the frequency reduction. Through this 0R circuit, the display data can be preferentially invalidated or simultaneously invalidated. The reference numeral 147 denotes an AND circuit for generating a power supply ON/OFF signal indicating whether the electric power is supplied to the power supply circuit or not. In case that the display OFF signal is "L", the power supply ON/OFF signal is set to the OFF state to stop the power supply to the flat display unit 106.

Figure 18:
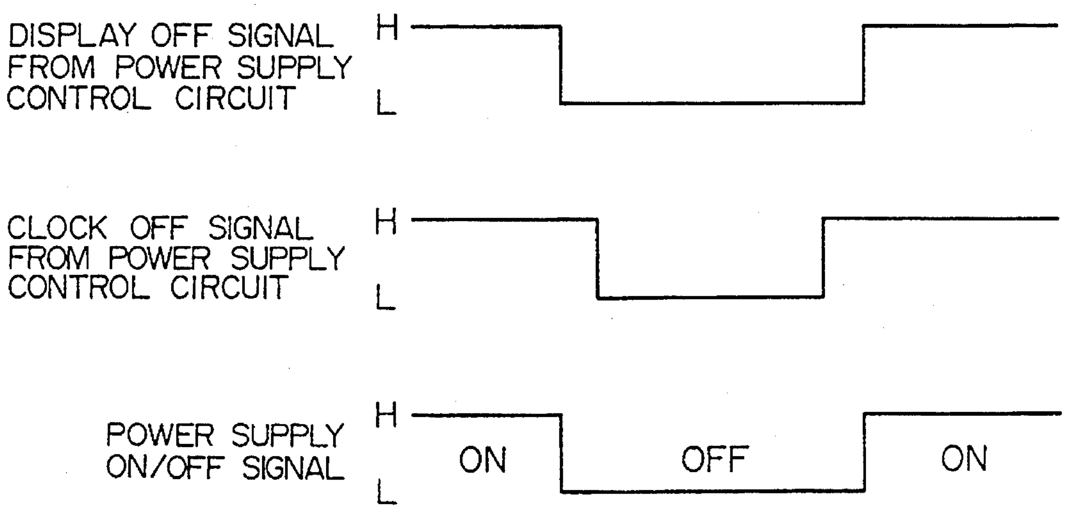
FIG. 18 is a timing chart for a display OFF signal and a display clock OFF signal.

FIG. 18 shows a timing chart of the display OFF signal from the power supply control circuit, the display clock OFF signal and the power supply ON/OFF signal. As shown, when it is desired to stop the power supply to the display of the display unit, the display OFF signal is set at its "L" level and then the display clock OFF signal for invalidating the display timing signal is set at its "L" level; whereas, when it is desired to begin the power supply to the display unit, the display clock OFF signal is set at its "H" level and then the display OFF signal is set at its "H" level.

Figure 19:
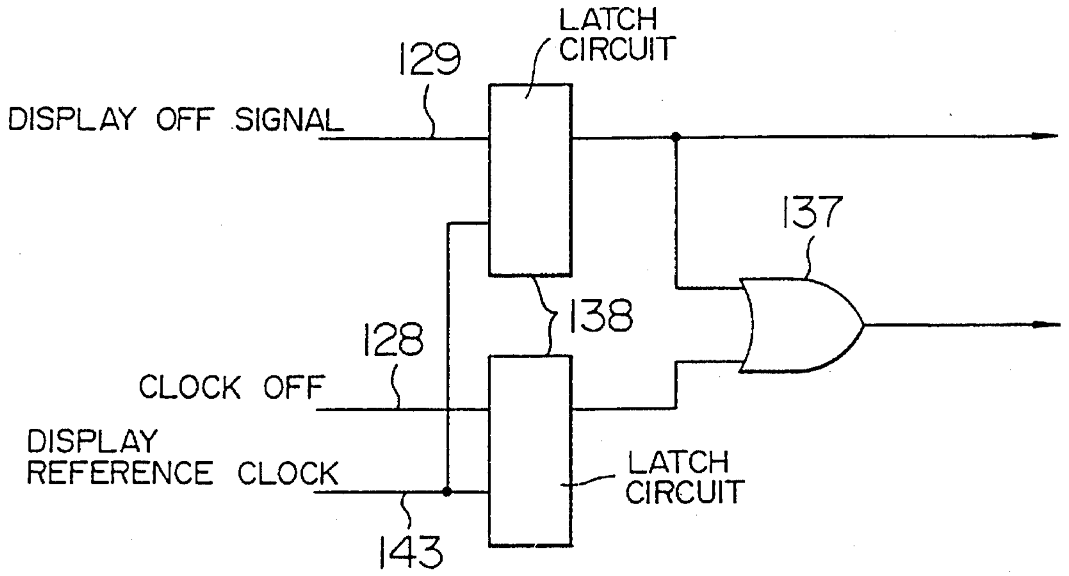
FIG. 19 is a block diagram of a display control circuit using latch circuits.

There is shown in FIG. 19 a block diagram of a display control circuit using latch circuits, which includes latch circuits 138 for holding the state of the display OFF signal and the state of the display clock OFF signal. In the drawing, reference numeral 143 denotes a display reference clock. The provision of the latch circuits at the input side of the OR circuit 137 enables the states of the display OFF signal and display clock OFF signal to be defined, while the synchronization with use of the display reference clock 143 enables the prevention of erroneous operation of the display OFF signal and display clock OFF signal at their input time. As a result, the generation of disturbance on the display screen can be prevented and the consumption power can be reduced.

Figure 20:
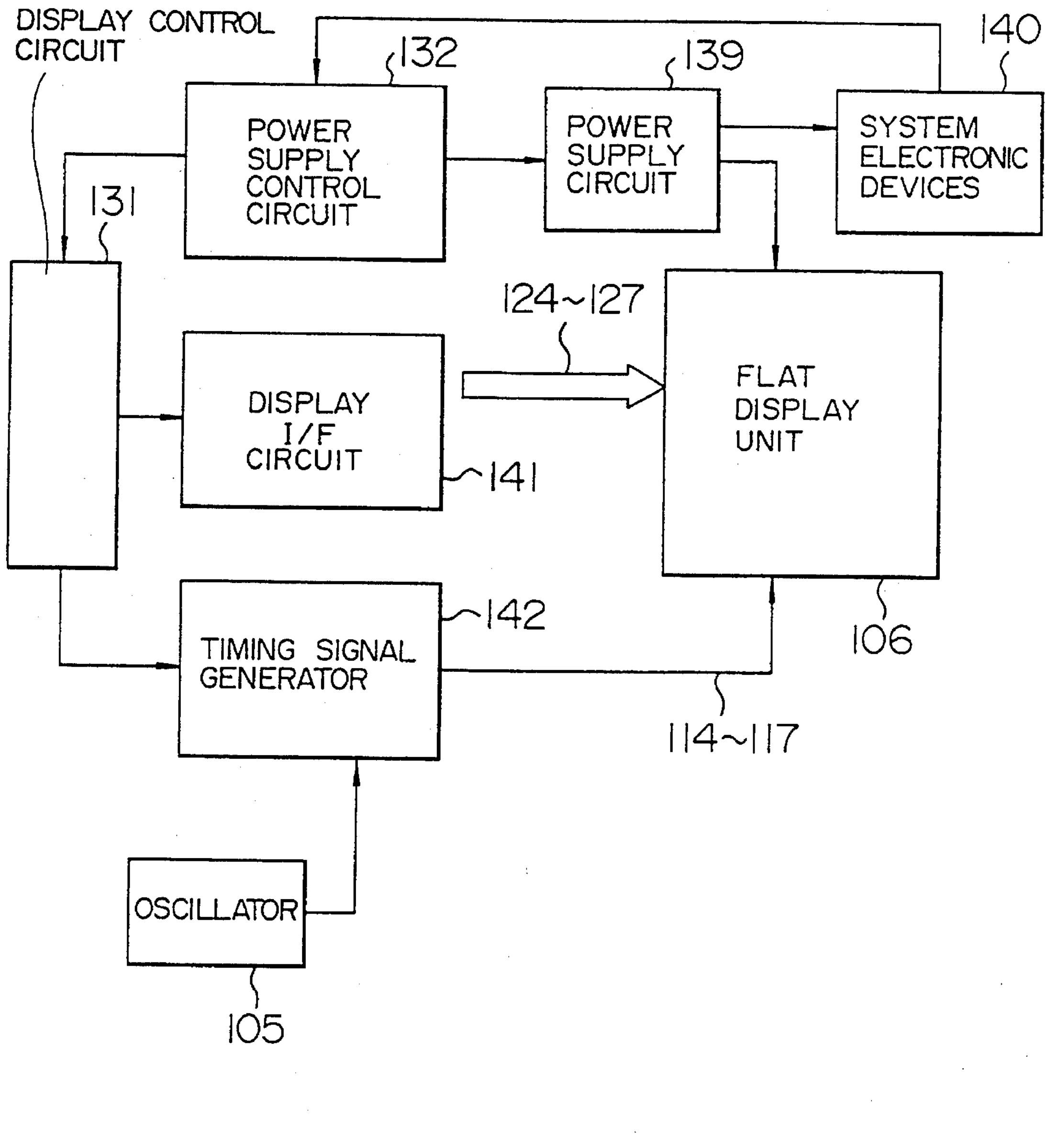
FIG. 20 is a block diagram of an interior of a power control/supply means.
Figure 21:
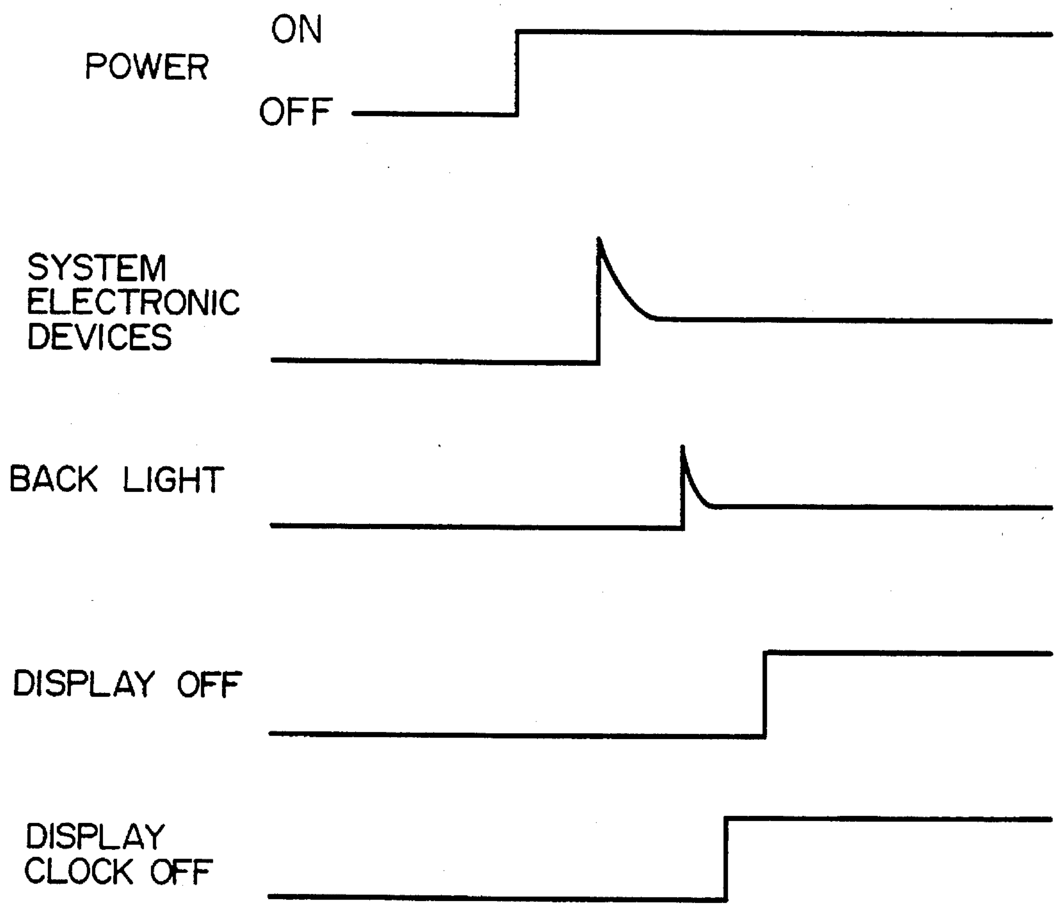
FIG. 21 is a timing chart for explaining the power supply control sequence of the present invention.

Shown in FIG. 20 is a block diagram a power control part of the data processor which includes electronic devices 140, power supply circuit 139 for supplying power to the electronic devices 40 and the flat display 106, a display I/F part 141 incorporating the display data control circuit 102 and the display I/F circuit 104, and a timing signal generator 142 incorporating the timing signal control circuit 101 and the timing signal generation circuit 103. In more detail, the power supply control circuit 132 receives a state indicative data from the electronic devices 140 and controls the power supply circuit 139 in such a manner that the power supply circuit 139 supplies power to the flat display unit 106 and the plurality of electronic devices 140 so as to cause, when power is turned ON, the plurality of electronic devices not to produce their peak consumption currents at the same time through an arbitrating means built in the power supply control circuit 132. This results in that, when power is turned ON, the competition between the peak values of the currents flowing through the electronic devices 140 of the data processor can be avoided as shown FIG. 21, whereby the capacity of the power supply can be reduced. In addition, when power is turned ON, the consumption power can be further reduced by invalidating the display data signals and the display timing signals.

Figure 22:
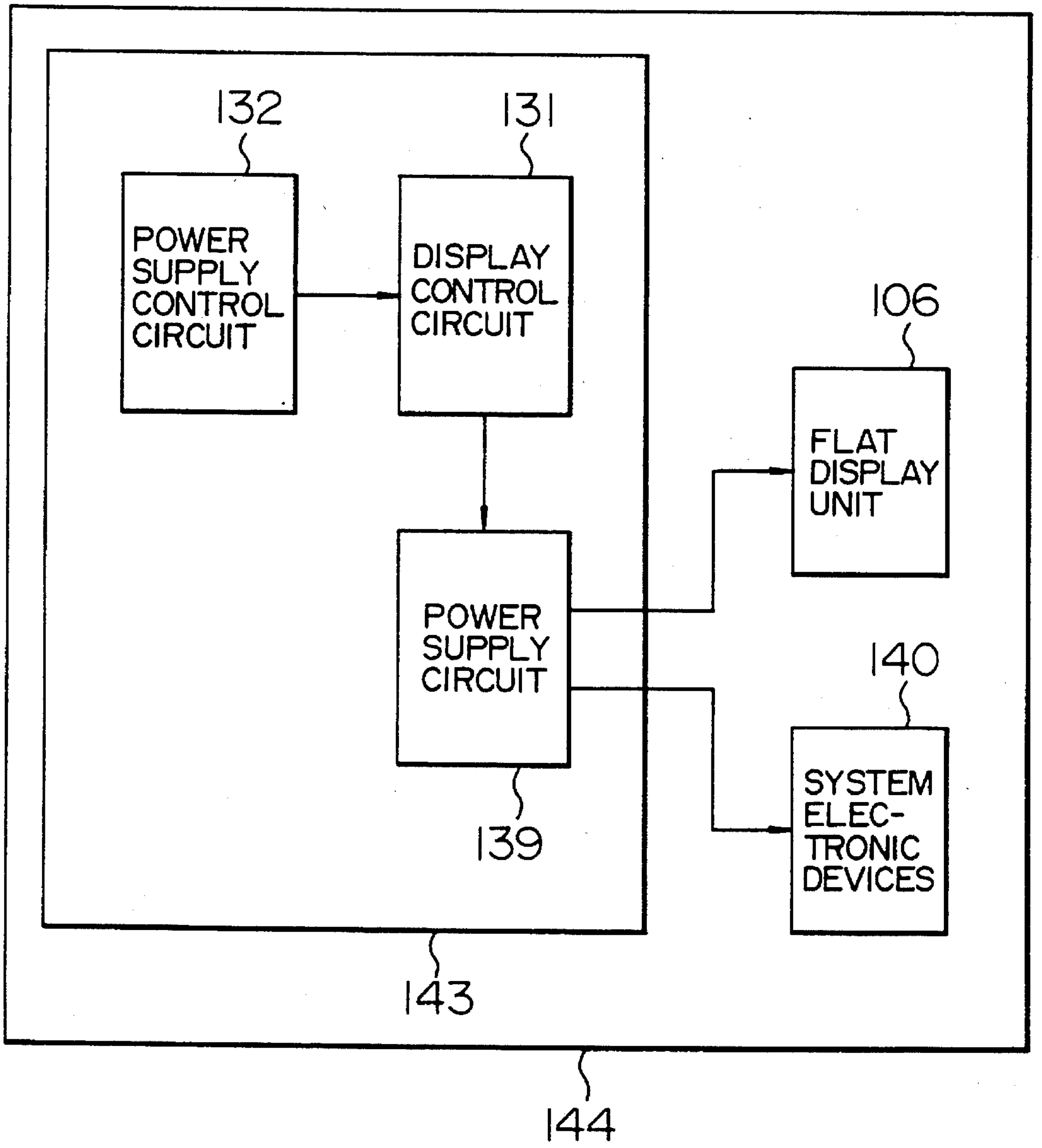
FIG. 22 is a block diagram showing a power supply system of the present invention.

Referring to FIG. 22, there is shown a block diagram of a power supply part in a data processing apparatus, which intends to supply power to the units of the data processing apparatus independently. In the drawing, a data processing apparatus 144 comprises the flat display unit 106, the electronic devices 140 and a logical circuit part 143. Since the units of the data processing apparatus are separated in this way even when the flat display unit 106 has the same 5V supply as the logical circuit part 143, the respective power supply of these units can be independently controlled. Therefore, when the power supply to the respective units can be sequentially controlled, the competition between the peak values of consumption currents of the respective units can be eliminated, the peak value or power supply capacity of the consumption current of the data processing apparatus can be estimated as a total of the peak value of the consumption current of one of the units and the stationary consumption current value of the other units, and thus the reduction of the power supply capacity can be realized.

What is claimed is:

1. A power supply controller for supplying power to a plurality of electronic devices divided into a first group of electronic devices and a second group of electronic devices, said power supply controller comprising:

a switch for allowing ON and OFF switching of a main power of said power supply controller;

at least one first power supply line supplying power from said switch to said first group of electronic devices at a first predetermined time referenced from a time of an ON switching of said switch;

a peak start-up current distributing circuit for reducing a peak current capacity requirement of said power supply controller by delaying power from said switch for a predetermined time period referenced from said time of said ON switching of said switch, and outputting delayed power at a second predetermined time which is later than said first predetermined time, to be supplied to said second group of electronic devices; and at least one second power supply line supplying delayed power from said peak start-up current distributing circuit to said second group of electronic devices, wherein said first group of electronic devices receiving power at said first predetermined time and said second group of electronic devices receiving delayed power at said second predetermined time results in a distribution of peak start-up currents of said first group of electronic devices and said second group of electronic devices over time, thereby to reduce a peak current capacity requirement of said power supply controller.

2. A data processing apparatus comprising:

a power supply controller as set forth in claim 1; and a liquid crystal display as said second group of electronic devices for receiving delayed power through said at least one second power supply line.

3. A power supply controller for controlling supply of power to electronic devices to reduce a peak current capacity requirement wherein said electronic devices are divided into a plurality of groups of electronic devices and supply of power to said plurality of groups is started at a different timing with respect to each group of electronic devices of said plurality of groups, for distributing peak start-up currents of said plurality of groups over time, thereby reducing a peak current capacity requirement of said power supply controller.

4. A data processing apparatus comprising:

at least one first device;

at least one second device;

a switch for allowing ON and OFF switching of a main power of said data processor apparatus;

a first power supply means for supplying power from said switch to said at least one first device at a first predetermined time referenced from a time of an ON switching of said switch;

a peak start-up current distributing circuit for reducing a peak current capacity requirement of said data processing apparatus by outputting, at a second predetermined time which is later than said first predetermined time, power received from said switch as delayed power to be supplied to said at least one second device; and a second power supply means for supplying delayed power from said peak start-up current distributing circuit to said at least one second device, wherein said at least one first device receiving power at said first predetermined time and said at least one second device receiving power at said second predetermined time results in a distribution of peak start-up currents of said at least one first device and said at least one second device over time, thereby to reduce a peak current capacity requirement of said data processing apparatus.

5. A data processing apparatus as set forth in claim 4, wherein said at least one second device includes a liquid crystal display and an illumination means for said liquid crystal display.

6. A data processing apparatus as set forth in claim 4, wherein said at least one second device includes a magnetic memory.

7. A data processing apparatus as set forth in claim 4, wherein a plurality of devices including said at least one second device are classified into a plurality of groups of devices, and power supply is started at a different timings with respect to each group of devices of said plurality of groups.

8. A data processing apparatus having an arrangement to reduce a peak current capacity requirement, said apparatus comprising:

a plurality of devices divided into groups of devices;

an electric power source for supplying an electric power to said plurality of devices; and an electric power supply control means for controlling times and an order of a supply of electric power from said electric power source to respective said groups of devices of said plurality of devices during at least one of an electric power up and an electric power consumption mode, for distributing peak start-up currents of said groups of devices over time, thereby reducing a peak current capacity requirement of said data processing apparatus.

9. A data processing apparatus as set forth in claim 8, wherein said plurality of devices include at least one liquid crystal display device and said electric power supply control means controls a time and order of a supply of electric power such that said at least one liquid crystal display device receives electric power at a time later than at least one respective group of devices of said plurality of devices.

* * * * *